United States Patent
Mayer

(10) Patent No.: US 9,975,401 B2
(45) Date of Patent: May 22, 2018

(54) METHOD AND APPARATUS FOR AVOIDING WINDOWPANE MISTING IN A VEHICLE

(71) Applicant: Ford Global Technologies, LLC, Dearborn, MI (US)

(72) Inventor: Walter Mayer, Bruehl (DE)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 15/171,366

(22) Filed: Jun. 2, 2016

(65) Prior Publication Data
US 2016/0361973 A1 Dec. 15, 2016

(30) Foreign Application Priority Data
Jun. 12, 2015 (DE) .......................... 10 2015 210 759

(51) Int. Cl.
*B60H 1/00* (2006.01)
*G05B 13/04* (2006.01)

(52) U.S. Cl.
CPC ..... *B60H 1/00807* (2013.01); *B60H 1/00764* (2013.01); *B60H 1/00785* (2013.01); *G05B 13/042* (2013.01)

(58) Field of Classification Search
CPC ............ B60H 1/00764; B60H 1/00785; B60H 1/00807
See application file for complete search history.

(56) References Cited

U.S. PATENT DOCUMENTS

| | | | |
|---|---|---|---|
| 2006/0000597 A1* | 1/2006 | Errington | B60H 1/00785 165/204 |
| 2008/0072669 A1* | 3/2008 | Paukkunen | G01W 1/08 73/335.02 |
| 2014/0129044 A1* | 5/2014 | Wenzel | G05D 23/19 700/300 |

FOREIGN PATENT DOCUMENTS

| | | |
|---|---|---|
| DE | 19942286 C1 | 8/2000 |
| DE | 102011084278 A1 | 4/2013 |
| JP | 63180514 A | 7/1988 |
| JP | 07280767 A | 10/1995 |

* cited by examiner

*Primary Examiner* — Kimberly S Berona
*Assistant Examiner* — Anshul Sood
(74) *Attorney, Agent, or Firm* — Vichit Chea; Price Heneveld LLP

(57) ABSTRACT

An apparatus for avoiding windowpane misting in a vehicle, in particular a motor vehicle, by activating an anti-misting mode on the basis of measured values of the air humidity and air temperature in the interior of the vehicle and the outside temperature in the environment of the vehicle, a dew or frost point being determined from the measured values. The determination of the dew or frost point is based on variables which are the measured values of the air humidity and the air temperature plus their respective tolerances.

18 Claims, 7 Drawing Sheets

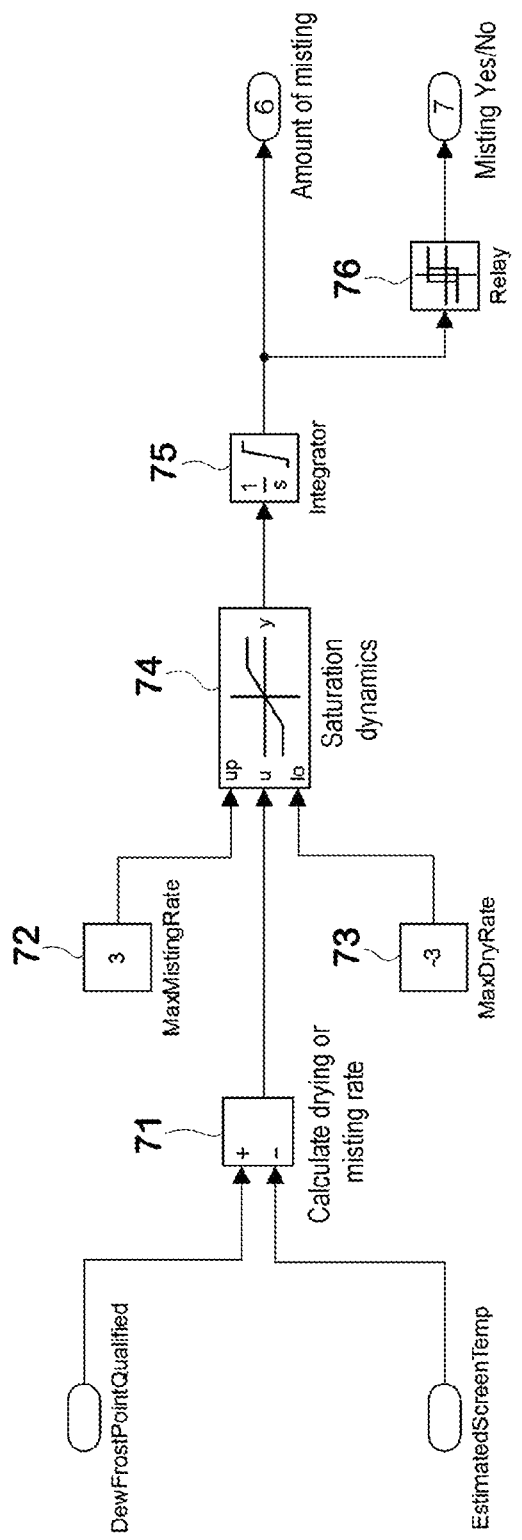

METHOD AND APPARATUS FOR AVOIDING WINDOWPANE MISTING IN A VEHICLE

FIELD OF THE INVENTION

The present invention generally relates to a method and an apparatus for avoiding or reducing windowpane misting, namely the misting of the windowpanes in a vehicle, in particular a motor vehicle, by activating an anti-misting mode of a ventilation and/or air-conditioning system of the vehicle on the basis of measured values of the air humidity and air temperature in the interior of the vehicle and the outside temperature in the environment of the vehicle, a dew or frost point being determined from the measured values.

BACKGROUND OF THE INVENTION

Motor vehicles often experience misting of the windowpanes caused by moisture such as that from dew or frost which can reduce visibility. A method of reducing windowpane misting in a vehicle is known from DE 102011084278 A1 which is hereby incorporated by reference. The humidity sensor and the inside temperature sensor are arranged close to one another but not in the vicinity of the windowpane. The anti-misting mode is activated if the dew point is greater than the outside temperature or if the temporal change in the measured values from the humidity sensor or the change in the dew point is greater than a preset threshold value. The dew point is compared with the outside temperature, after it has been corrected on the basis of a preset function of the difference between the outside temperature and the inside temperature. This correction function is used to model the temperature gradient through the windowpane, which temperature gradient is a function of the difference between the outside temperature and the inside temperature. It would be desirable to improve the reliability of the known method of reducing windowpane misting.

SUMMARY OF THE INVENTION

According to one aspect of the present invention, a method for avoiding windowpane misting in a vehicle is provided. The method includes the steps of measuring air humidity and air temperature in an interior of the vehicle and determining a dew or frost point based on the measured air humidity and the air temperature plus respective sensor tolerances. The method also includes the steps of measuring an outside temperature in an environment of the vehicle and activating an anti-misting mode based on the determined dew or frost point and the outside temperature.

According to another aspect of the present invention, a method for avoiding windowpane misting in a vehicle is provided. The method includes the steps of measuring air humidity and air temperature in an interior of the vehicle and determining a dew or frost point based on the measured air humidity and the air temperature plus respective sensor tolerances. The method also includes the steps of determining a windowpane temperature and activating an anti-misting mode based on the determined dew or frost point and the determined windowpane temperature.

According to a further aspect of the present invention, an apparatus for avoiding windowpane misting in a vehicle is provided. The apparatus includes an air humidity sensor sensing air humidity in an interior of the vehicle and an interior temperature sensor sensing interior air temperature in the interior. The apparatus also includes an outside temperature sensor sensing outside temperature near the vehicle and a controller determining a dew or frost point based on sensed air humidity and air temperature and respective sensor tolerances and activating an anti-misting mode based on the determined dew or frost point and the outside temperature.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a block diagram illustrating a detailed view of block group G in FIG. 1.

DETAILED DESCRIPTION OF THE PREFERRED EMBODIMENTS

Figure 1:
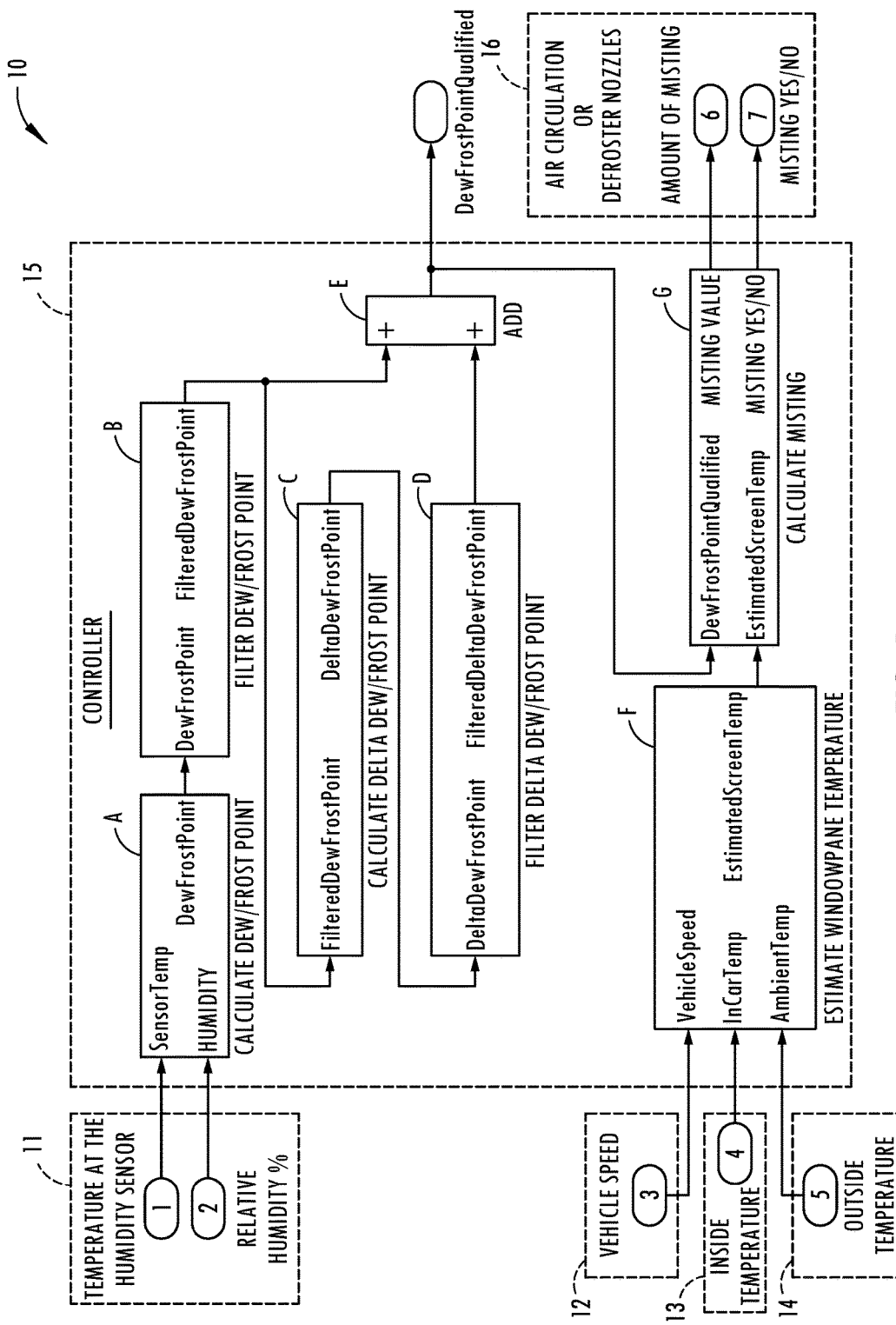
FIG. 1 is a block/flow diagram illustrating an overview of a method for detecting and avoiding windowpane misting in a vehicle, according to one embodiment.
Figure 2:
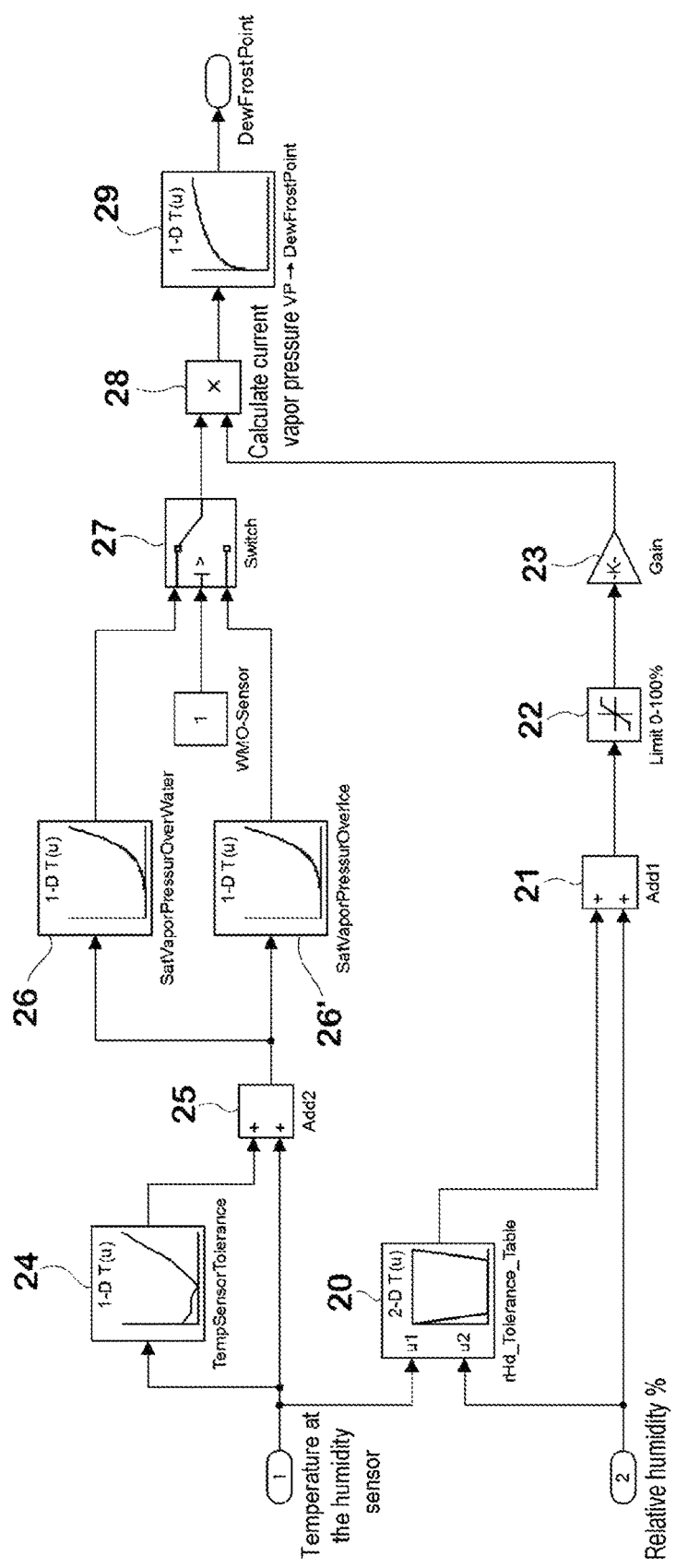
FIG. 2 is a block diagram illustrating a detailed view of block group A in FIG. 1.
Figure 3:
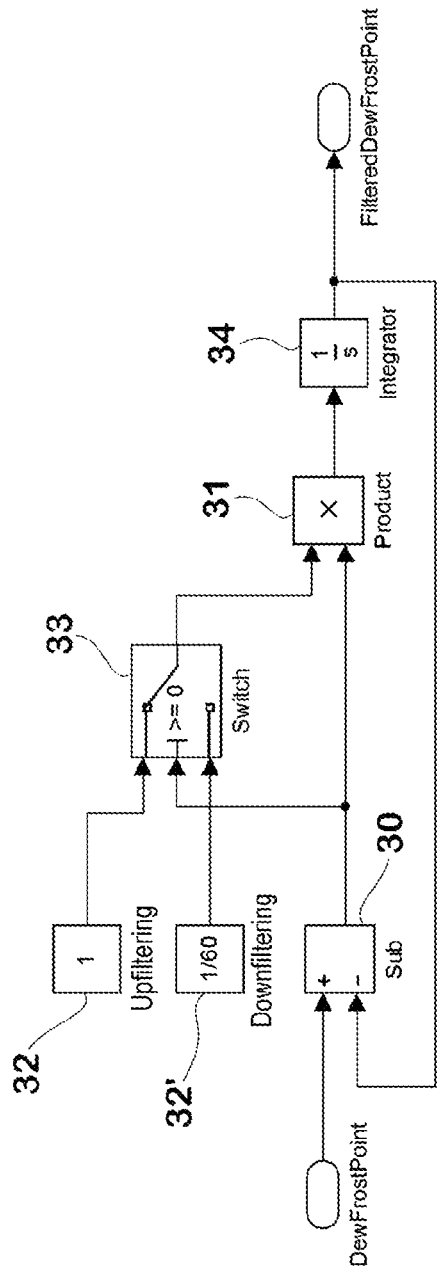
FIG. 3 is a block diagram illustrating a detailed view of block group B in FIG. 1.

According to embodiment shown and described herein, the dew or frost point is determined on the basis of variables which are the measured values of the air humidity and the air temperature plus their respective tolerances. That is to say, sensor tolerances are included almost as raw signals for a pessimistic estimation. Because the sensor tolerances are not uniformly distributed over the respective measurement range, because the sensor tolerance of the air humidity is also dependent on the temperature and because the dew point is calculated in a non-linear manner, such a pessimistic estimation can nevertheless be considerably finer and more up-to-date than if any tolerances are taken into account only subsequently by means of a simple spacing between the dew point and the windowpane temperature.

It has been shown that it is possible to determine the non-linearly temperature-dependent sensor tolerance for the temperature and the non-linearly temperature-dependent and humidity-dependent sensor tolerance for the humidity in advance with a reasonable amount of effort by means of bench tests. They can then be stored as tables and read out when carrying out the method. All of this is best achieved using a combined humidity sensor which measures the temperature and relative humidity of the air surrounding it very close together, to be precise preferably in the lower interior of the vehicle.

In one preferred embodiment, the scale according to which the humidity sensor measures, in particular whether it is a so-called WMO sensor or a standard sensor, is automatically taken into account when carrying out the method, two different relationships between the air humidity and saturation vapor pressure being provided, from which a choice is made on the basis of the type of installed humidity sensor.

In one preferred embodiment, the determined dew or frost point is subjected to low-pass filtering with asymmetric time constants, is then differentiated asymmetrically and is then subjected to low-pass filtering with asymmetric time constants, and the low-pass filtered dew or frost point and the low-pass filtered asymmetrically differentiated dew or frost point, the latter optionally with a suitable weighting factor, are added to form a qualified dew or frost point. That is to say, work is carried out with a fast filter if the temperature from which misting or icing can occur increases and conversely work is carried out with a slow filter. Adding with or without a weighting factor takes into account the fact that humidity sensors react relatively slowly to humidity changes. An unfavorable evolution of humidity is taken into account in an anticipatory manner as it were with the aid of the derivative, the asymmetry of which accelerates the sensor response. Conversely, the derivative is set to zero, however, and a pessimistic estimation is therefore likewise carried out. As a result, the qualified dew or frost point constitutes a particularly reliable estimation which is not unnecessarily rough, however, but rather meets the current prevailing conditions.

In one preferred embodiment, a windowpane inside temperature is estimated from the vehicle speed, the inside temperature and the outside temperature, to be precise only from these variables, with reference to a physical/control model which also takes into account the thermal capacity of the windowpane(s). DE 199 42 286 C1 which is herein incorporated by reference discloses a method for avoiding windowpane misting in a vehicle, in which the windshield temperature can be determined with reference to the variables mentioned and additional sensor signals using a computing model based on empirical studies. With the method disclosed in DE 199 42 286 C1 sensor signals for the temperature and speed of the air flowing from the defroster nozzles, in particular, cannot be dispensed with for this purpose, and the document does not disclose and it is not readily possible using a model obtained from empirical studies to also take into account the temperature changes delayed by the thermal capacity of the glass.

In a vehicle, there are many windowpanes with a different tendency to mist and there are different possibilities or circumstances which counteract the misting. According to the disclosed method and apparatus, misting generally begins where there is the least air flow. The inventive method and apparatus makes it possible to achieve freedom from misting on all windowpanes using relatively few parameters and using parameters which can be determined relatively easily without having to specifically take into account all the different influencing variables for the misting or defrosting of the windowpanes. Rather, a windowpane temperature model which is simultaneously valid for all windowpanes and is a type of worst-case estimation is used within the scope of the invention. For this purpose, the physical/control model is based on families of characteristics which are created in such a manner that the lowest temperature of any windowpane is assumed for the avoidance of windowpane misting. This also makes it possible to prevent, for example, the misting of a side window or any windowpane in the rear part of the vehicle obscuring the driver's view to the rear.

In one preferred embodiment, the thermal capacity of the glass, which allows the windowpanes to assume a new temperature in a delayed manner, is taken into account by subjecting a windowpane inside temperature calculated from the vehicle speed, the inside temperature and the outside temperature to low-pass filtering.

Like for the determination of the dew or frost point, it is also advantageous to take into account almost raw signals for the estimation of the windowpane inside temperature since the corresponding sensor tolerances are not uniformly distributed over the respective measurement range. In this case, a tolerance subtraction instead of a tolerance addition is carried out on the measured values of the inside temperature and the outside temperature for a pessimistic estimation.

In one preferred embodiment, the current amount of misting is calculated by integrating the difference between the dew or frost point, in particular the qualified dew or frost point mentioned, and the estimated windowpane inside temperature which represents the current drying or misting rate, the amount of misting also being able to be used to detect whether or not misting is currently possible. Depending on the possibility of misting and possibly the current amount of misting, an optimally need-related anti-misting mode can be carried out by controlling the amount and/or temperature of the defroster air. Concomitantly calculating the amount of water reaching the windowpanes during misting makes it possible to maintain the drying conditions set after misting for long enough so that the windowpane(s) become entirely free of misting again.

The method described by way of example below for avoiding windowpane misting in a vehicle, in particular an automobile, is started as soon as the vehicle is activated and is then carried out repeatedly.

The vehicle contains a humidity sensor which measures the temperature and relative humidity of the air surrounding it very close together. If possible, this humidity sensor is not situated close to any windowpane of the vehicle but rather is situated at a location with a certain amount of air circulation, for example in the lower interior of the vehicle, and it may also have its own fan or an integrated fan, with the result that any change in the air humidity of the interior air can be recorded quickly.

Apart from the abbreviations for intermediate results used in the figures, some designations on computing blocks are also in English in a manner corresponding to the Simulink representation used here.

A method and apparatus 10 for avoiding or reducing windowpane misting by activating an anti-misting mode of a ventilation and/or air conditioning system in a vehicle is illustrated in FIGS. 1-7. The apparatus 10 includes a controller 15 such as a ventilation and/or air conditioning system controller that receives measured inputs from sensors, processes the sensed inputs according to the method and controls air circulation flaps or defroster nozzles to activate and control the anti-misting mode.

In accordance with FIG. 1-5, the temperature 1 and relative humidity 2 measured by the humidity sensor 11 are processed as follows. In particular, a humidity sensor 11 of the capacitor type can provide temperature-dependent measured values which can be corrected in a manner known per se. In such a case, the measured value subsequently used for the relative humidity 2 would have already been temperature-corrected in the sensor 11.

In block 20, the humidity tolerance associated with the measured temperature 1 and humidity 2 is taken from a two-dimensional table of the measured value tolerance of the relative humidity created using bench tests and is added to the measured relative humidity 2 in block 21. The sum obtained is limited to 100% in block 22 and is multiplied by a predefined gain factor or multiplier K in block 23.

The term "table" denotes here look-up tables or families of characteristics which are each stored with a multiplicity of individual values in the air-conditioning system controller 15; nevertheless, the term "table," as used herein, is also intended to include any other suitable ways of being able to obtain the corresponding output values.

In block 24, the temperature tolerance associated with the measured temperature 1 is taken from a one-dimensional table of the measured value tolerance of the temperature created using bench tests and is added to the measured temperature 1 in block 25.

In blocks 26 and 26', the saturation vapor pressure over water or ice associated with the temperature calculated in block 25 is taken from a predefined one-dimensional table, and a choice is made between the outputs of blocks 26 and 26' in a switch 27, to be precise on the basis of a binary value which indicates whether the humidity sensor installed in this vehicle measures according to the standard scale, in which relative humidities of more than 100% which correspond to supersaturation can occur, or according to the WMO scale in which 100% air humidity corresponds to the maximum possible humidity of supersaturated air. This difference is particularly relevant for estimating windowpane misting in a motor vehicle since the windowpane misting occurs at relatively high air humidities.

In block 28, the output variables from blocks 23 and 27, that is to say the variables of relative humidity and saturation vapor pressure calculated as described above, are multiplied by one another, which reveals the currently prevailing vapor pressure, and the dew or frost point DewFrostPoint associated with this vapor pressure VP is taken from a known one-dimensional table in block 29. The table values for the dew or frost point are identical at the triple point of water, which corresponds to a saturation vapor pressure of 611.2 Pa, and the dew point is referred to above the triple point and the frost point is referred to below the triple point.

The dew or frost point DewFrostPoint determined in this manner is subjected to low-pass filtering in block group B (FIG. 3) to form a variable FilteredDewFrostPoint. For this purpose, the difference between DewFrostPoint and FilteredDewFrostPoint calculated in block 30 is multiplied by a time constant 32 or 32' in block 31. The position of a switch 33 determines which of the two time constants 32 and 32' is used. If the filter output variable FilteredDewFrostPoint is less than the filter input variable DewFrostPoint, a short time constant 32 (here with the value 1) is used. If the filter output variable FilteredDewFrostPoint is greater than the filter input variable DewFrostPoint, a long time constant 32' (here with the value 1/60) is used. The product formed in block 31 is subjected to time integration in block 34 to form the filtered dew or frost point FilteredDewFrostPoint.

Figure 4:
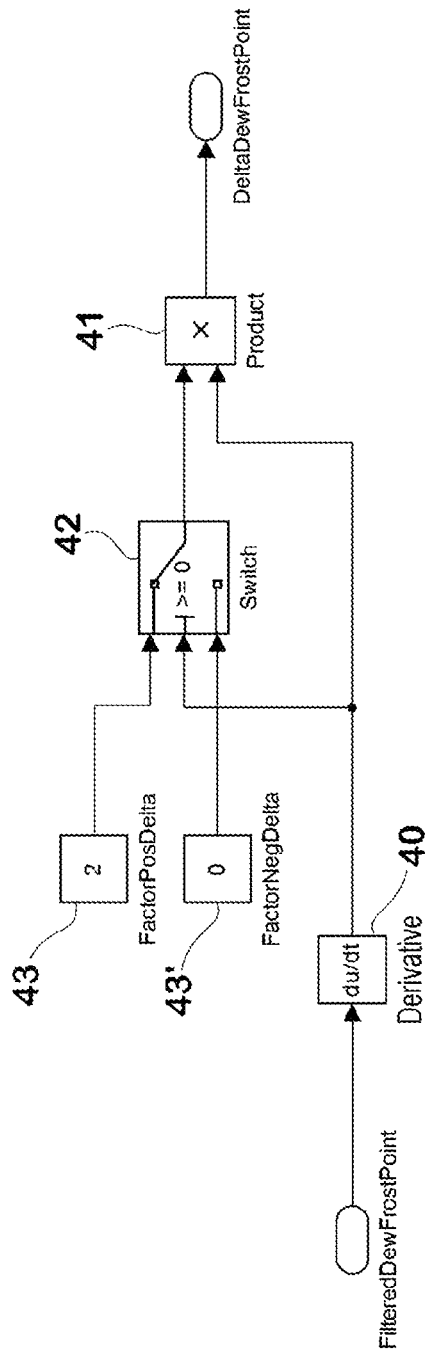
FIG. 4 is a block diagram illustrating a detailed view of block group C in FIG. 1.
Figure 5:
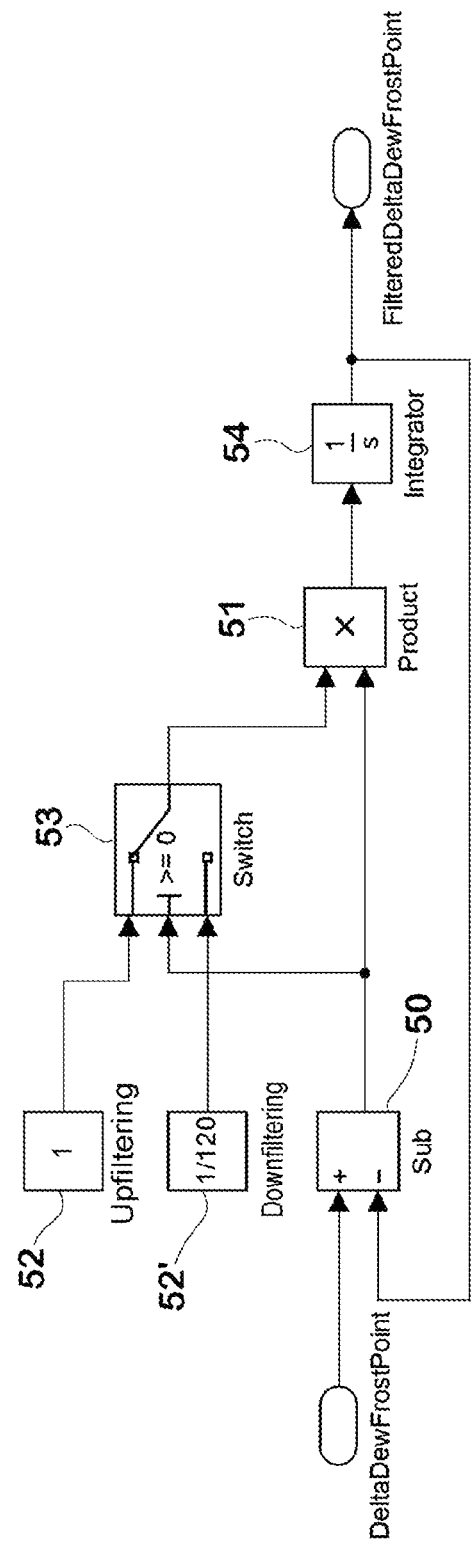
FIG. 5 is a block diagram illustrating a detailed view of block group D in FIG. 1.

The dew or frost point FilteredDewFrostPoint filtered in block group B is asymmetrically differentiated in block group C (FIG. 4). For this purpose, the time derivative of FilteredDewFrostPoint formed in block 40 is multiplied by a multiplication factor in block 41 to form an output variable DeltaDewFrostPoint. The position of a switch 42 determines whether a multiplication factor FactorPosDelta 43 (here with the value 2) or a multiplication factor FactorNegDelta 43' (here with the value 0) is used. In particular, if the derivative of FilteredDewFrostPoint is positive, it is multiplied by a positive factor and is otherwise set to zero.

The dew or frost point DeltaDewFrostPoint asymmetrically differentiated in block group C is subjected to low-pass filtering in block group D (FIG. 5) to form a variable FilteredDeltaDewFrostPoint. For this purpose, the difference between DeltaDewFrostPoint and FilteredDeltaDewFrostPoint calculated in block 50 is multiplied by a time constant 52 or 52' in block 51. The position of a switch 53 determines which time constant is used. If the filter output variable FilteredDeltaDewFrostPoint is less than the filter input variable DeltaDewFrostPoint, a short time constant 52 (here with the value 1) is used. If the filter output variable FilteredDeltaDewFrostPoint is greater than the filter input variable DewFrostPoint, a long time constant 52' (here with the value 1/120) is used. The product formed in block 51 is subjected to time integration in block 54 to form the filtered differentiated dew or frost point FilteredDeltaDewFrostPoint.

As shown in FIG. 1, the filter output variable FilteredDewFrostPoint from block group B and the filter output variable FilteredDeltaDewFrostPoint from block group D are added in block E to form a qualified dew or frost point DewFrostPointQualified which is essential for the further method for detecting windowpane misting. The figure does not show that the output variable FilteredDeltaDewFrostPoint from block group D can also be multiplied by a suitable weighting factor before it is supplied to block E.

Figure 6:
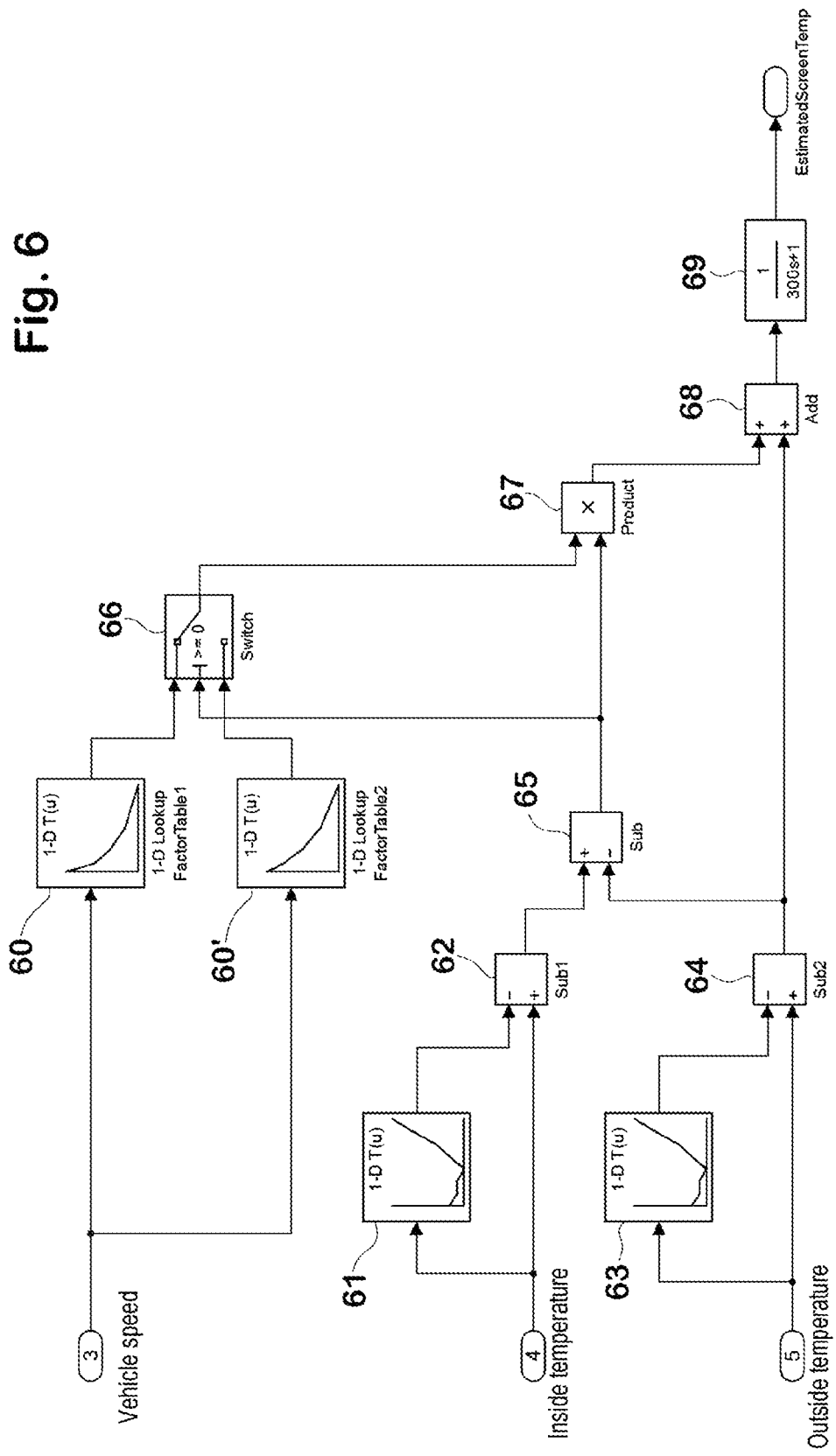
FIG. 6 is a block diagram illustrating a detailed view of a block group F in FIG. 1.

As shown in more detail in FIG. 6, a windowpane temperature, to be precise as the lowest temperature which can be assumed by any windowpane of the vehicle on its inside under the measured conditions, is estimated in block group F using the vehicle speed 3 measured by vehicle speed sensor 12, the temperature 4 in the passenger compartment measured by interior temperature sensor 13 and the temperature 5 in the environment of the vehicle measured by outside temperature sensor 14, which are obtained from corresponding sensors 12, 13 and 14 installed in the vehicle.

Although the temperature measured by the humidity sensor 11 could be taken as the vehicle inside temperature, it is preferred here to measure the humidity 2 and the inside temperature 4 used to estimate the windowpane temperature independently of one another at separate locations in the vehicle. This is because a location which is optimum for measuring the temperature of the air in contact with the windowpanes may be a different location from a location optimum for measuring the air humidity.

Vehicle-specific tests are used to create two one-dimensional tables 60 (FactorTable1) and 60' (FactorTable2) which are families of characteristics each providing factors Factor1 and Factor2 for the cooling of the windowpane on the basis of the vehicle speed 3. At a speed of zero, the factor is equal to 0.5 and decreases with increasing speed.

The tolerance value taken from an empirically determined one-dimensional table 61 of the measurement tolerance of the interior temperature sensor 13 for the inside temperature 4 is subtracted from the inside temperature 4 in block 62, and the tolerance value taken from an empirically determined one-dimensional table 63 of the measurement tolerance of the outside temperature sensor 14 for the outside temperature 5 is subtracted from the outside temperature 5 in block 64.

The difference between the output variables from blocks 62 and 64 is calculated in block 65, that is to say the outside temperature 5' reduced by the sensor tolerance is subtracted from the inside temperature 4' reduced by the sensor tolerance, and if this difference is greater than zero, that is to say if the inside temperature 4' is greater than outside temperature 5', a switch 66 chooses the output variable Factor1 from the table 60 for further use and otherwise chooses the output variable Factor2 from the table 60'.

The chosen speed-dependent factor Factor1 or Factor2 is multiplied by the output variable from block 66 in block 67, and the product is added to the tolerance-reduced outside temperature in block 66. That is to say, the temperature value calculated in block 68 corresponds to: tolerance-reduced outside temperature+((tolerance-reduced inside temperature−tolerance-reduced outside temperature)×Factor1 or Factor2).

The temperature value calculated in block 68 is subjected to low-pass filtering in block 69 which comprises a transfer function, as a result of which the thermal capacity of the windowpane is simulated. The result is a variable EstimatedScreenTemp which is an estimated value for the windowpane temperature.

As shown in more detail in FIG. 7, the estimated value for the windowpane temperature EstimatedScreenTemp obtained from block group F is subtracted in block 71 in block group G from the qualified dew or frost point DewFrostPointQualified obtained from block E, which produces a measure of how quickly the windowpane mists if the measure is greater than zero or of how quickly the windowpane dries if the measure is less than zero.

The drying or misting rate obtained in block 71 is limited to values which can be calibrated in block 74. If it is greater than a value MaxMistingRate (here equal to 3) predefined in block 72, the drying or misting rate is set to this value for maximum misting and, if it is less than a value MaxDryRate (here equal to −3) predefined in block 73, the drying or misting rate is set to this value for maximum drying.

The current amount of misting on the windowpane is calculated by integrating the drying or misting rate in block 75. In this case, the amount of misting is limited to minimum and maximum values, as illustrated by the limiting symbol in block 75, namely to the effect that a negative amount of misting produces the amount of misting zero, that is to say the windowpane is dry, and an amount of misting greater than a predefined maximum value is set equal to the maximum value which indicates that the windowpane is completely misted.

If the amount of misting obtained in block 75 is greater than zero, the amount of misting 6 and a binary value 7 for misting Yes or No, which is generated in a threshold value block 76, are output. If the binary value 7 indicates that misting is possible, an anti-misting mode is carried out by opening air circulation flaps or defroster nozzles 16, for example, in order to blow more and/or warmer air onto the inner surfaces of the windowpanes, in which case the amount and/or temperature of the defroster air can be controlled on the basis of the determined amount of misting 6.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for avoiding windowpane misting in a vehicle, comprising:
   measuring air humidity and air temperature in an interior of the vehicle;
   determining a dew or frost point based on the measured air humidity and the air temperature plus respective sensor tolerances;
   measuring an outside temperature in an environment of the vehicle; and
   activating an anti-misting mode based on the determined dew or frost point and the outside temperature, wherein the determined dew or frost point is subjected to low-pass filtering with asymmetric time constants, the low-pass filtered dew or frost point is differentiated asymmetrically, the asymmetrically differentiated dew or frost point is subjected to low-pass filtering with asymmetric time constants, and the low-pass filtered dew or frost point and the low-pass filtered asymmetrically differentiated dew or frost point are added to form a qualified dew or frost point.

2. The method as claimed in claim 1 further comprising steps of determining the sensor tolerance for the air temperature in the form of a non-linear temperature-dependent variable and the sensor tolerance for the air humidity in the form of a non-linear temperature-dependent and humidity-dependent variable in advance and storing the sensor tolerances as tables.

3. The method as claimed in claim 1 further comprising a step of calculating a saturation vapor pressure from the measured air humidity plus the sensor tolerance for the measured air humidity, two different relationships between the air humidity and saturation vapor pressure being provided, from which a choice is made on the basis of a type of installed humidity sensor.

4. The method as claimed in claim 1, wherein the low-pass filtered asymmetrically differential dew or frost point includes a weighting factor.

5. The method as claimed in claim 1 further comprising a step of estimating a windowpane inside temperature using a vehicle speed, the inside air temperature and the outside temperature with reference to a model which also takes into account the thermal capacity of windowpanes.

6. The method as claimed in claim 5 further comprising a step of calculating a current amount of misting by integrating a difference between the qualified dew or frost point and the estimated windowpane inside temperature.

7. The method as claimed in claim 5, wherein the estimated windowpane inside temperature is formed by subjecting a windowpane inside temperature calculated from the vehicle speed, the inside air temperature and the outside temperature to low-pass filtering.

8. The method as claimed in claim 5, wherein the estimation of the windowpane inside temperature is based on variables which are the measured values of the inside air temperature and the outside temperature minus their respective sensor tolerances.

9. The method as claimed in claim 1 further comprising a step of calculating a current amount of misting by integrating the difference between the dew or frost point and an estimated windowpane inside temperature.

10. The method as claimed in claim 1, wherein the vehicle is a motor vehicle.

11. A method for avoiding windowpane misting in a vehicle, comprising:
    measuring air humidity and air temperature inside the vehicle;
    determining a dew or frost point based on the measured air humidity and inside temperature plus respective sensor tolerances;
    determining a windowpane temperature based on vehicle speed and the difference between inside temperature and a measured outside temperature; and
    activating an anti-misting mode based on the determined dew or frost point and the determined windowpane temperature.

12. The method as claimed in claim 11, wherein the step of determining the windowpane temperature comprises estimating the windowpane temperature as a function of the measured outside temperature and the measured inside temperature and the vehicle speed.

13. The method as claimed in claim 12 further comprising a step of calculating a current amount of misting by integrating a difference between the dew or frost point and an estimated windowpane inside temperature.

14. The method as claimed in claim 11 further comprising steps of determining the sensor tolerance for the air temperature in the form of a non-linear temperature-dependent variable and the sensor tolerance for the air humidity in the form of a non-linear temperature-dependent and humidity-dependent variable in advance and storing the sensor tolerances as tables.

15. The method as claimed in claim 11, wherein the estimated windowpane temperature is an estimated windowpane inside temperature.

16. An apparatus for avoiding windowpane misting in a vehicle, comprising:
an air humidity sensor sensing air humidity in an interior of the vehicle;
an interior temperature sensor sensing interior air temperature in the interior;
an outside temperature sensor sensing outside temperature near the vehicle; and
a controller determining a dew or frost point based on sensed air humidity and air temperature and respective sensor tolerances and activating an anti-misting mode based on the determined dew or frost point and the outside temperature, wherein the controller determines an estimated windowpane temperature based on vehicle speed and the difference between the sensed interior air temperature and the sensed outside temperature, and determines activation of the misting as a function of the estimated windowpane temperature.

17. The apparatus as claimed in claim 16, wherein the controller further determines the sensor tolerance for the air temperature in the form of a non-linear temperature-dependent variable and the sensor tolerance for the air humidity in the form of a non-linear temperature-dependent and humidity-dependent variable in advance and stores the sensor tolerances as tables.

18. The apparatus as claimed in claim 16, wherein the controller calculates a saturation vapor pressure from the measured value of the air humidity plus the sensor tolerance for this measured value, two different relationships between the air humidity and saturation vapor pressure being provided, from which a choice is made on the basis of the type of installed humidity sensor.

* * * * *